Figure 1:
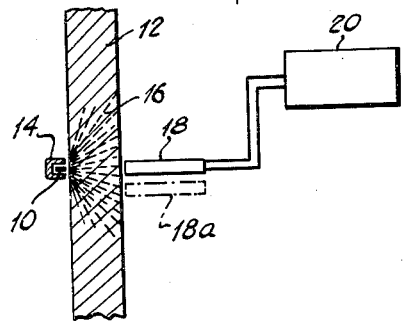

Nov. 1, 1949   G. HERZOG   2,486,845
MEASUREMENT OF WALL THICKNESS
Filed Nov. 21, 1945

INVENTOR
GERHARD HERZOG.
BY
ATTORNEY

Patented Nov. 1, 1949

2,486,845

UNITED STATES PATENT OFFICE 2,486,845

MEASUREMENT OF WALL THICKNESS

Gerhard Herzog, Houston, Tex., assignor to The Texas Company, New York, N. Y., a corporation of Delaware Application November 21, 1945, Serial No. 630,017

6 Claims. (Cl. 250—83.6)

This invention relates to the measurement of wall thickness and more particularly to a method and an apparatus whereby the thickness of a wall or plate can be measured without the use of any type of mechanical calipers or gauges and without the necessity of drilling or disfiguring the wall in any manner.

In measuring the thickness of a wall comprising, for example, the shell of a large tank, boiler or other vessel, it has heretofore been necessary generally to drill a hole through the wall at the desired place and then to insert a micrometer caliper through the hole to make the measurement. The hole must, of course, be closed afterwards either by means of a threaded plug, or by welding, or both, and in the case of vessels intended to hold fluids under high pressures, these plugged holes frequently cause trouble. The U. S. Letters Patent to D. G. C. Hare, No. 2,277,756, granted March 31, 1942, discloses a method of measuring the thickness of plates, pipe walls and the like without drilling, by causing penetrative radiation such as gamma rays to penetrate the wall and then measuring the amount of scattered rays returned to a detector placed near the radiation source and at the same side of the wall. The method disclosed in the patent has proved very satisfactory in commercial use, its only limitation being the fact that where gamma radiation is used to measure the thickness of a wall or plate of metal such as steel, the method is not too accurate where the steel thickness is greater than three-quarters of an inch.

In the U. S. Patent No. 2,349,429 granted to J. H. Stein and myself May 23, 1944, a method and apparatus for measuring thickness is disclosed which involves the measurement of penetrative radiation transmitted tangentially through a curved wall such as that of a pipe or tube. With that method thicknesses greater than three-quarters of an inch can be measured but the method cannot be used for measuring pipes or vessels of large diameter because the distance between the source and the detector becomes excessive. In the U. S. Patent No. 2,346,486 of D. G. C. Hare granted April 11, 1944, another method of measuring wall thicknesses is disclosed in which the source is located at one side of the wall and the radiation transmitted through the wall is measured by three detectors located at the points of a triangle generally opposite the source. By observing the outputs of the three detectors a computation can be made by mathematical or geometrical means of the amount of radiation transmitted directly from the source perpendicularly through the wall and the wall thickness at that point thereby determined. The present invention relates to a somewhat similar method but in which it is not necessary to use three detectors or to make the computations described in the patent.

There are many instances where the measurement of thickness by straight "transmission" would be very useful. Such a method is not limited by the thickness of the wall. In such a method the radioactive source is placed on one side of the wall and the detector held on the other side of the wall opposite the source. The intensity at the detector decreases with increasing wall thickness due to the absorption of the radiation while passing through the wall. The difficulty with such an arrangement lies in the proper alignment of the source and the detector. Assuming the thickness of the wall of a large vessel is to be measured, it is obviously difficult, if not impossible, for an operator outside the vessel to locate the point on the vessel's outer surface directly opposite a point on the inner surface of the vessel where a source of penetrative radiation is located without drilling a hole through the wall. It is to overcome this difficulty that the present invention has been made.

Let us suppose that in a large vessel the radioactive source is placed rigidly somewhere on the inside wall, for example, by means of a magnet adapted to hold the source against the wall or in a certain position with respect thereto. With a radiation detector on the outside of the vessel the intensity of the radiation can be measured at various points. The intensity naturally reaches a maximum when the detector is exactly opposite the source and if this position for maximum intensity can be found the wall thickness can then be easily determined.

In accordance with one embodiment of the invention two radiation detectors are used, one of which has a relatively small effective area and the other of which has an area several times as large. For example, an elongated detector of the counter type or an ionization chamber and preferably having a diameter of about one-quarter inch can be held normal to the outside surface of the vessel and moved about in the vicinity supposedly opposite the radiation source, while the output of the detector is observed. A detector of this type having a small diameter will show a very sharp maximum in its output when it is located in exact alignment with the source whereas a detector having a considerably larger effective area exposed to the radiation transmitted through the wall will provide an output curve having a broad peak. Because of this fact the small detector can be used to locate approximately the point on the outer surface of the wall opposite the radioactive source, after which the small detector is replaced at that point by the larger detector and a careful measurement of the transmitted radiation then made using the larger detector which is responsive, of course, to a much larger portion of the radiation transmitted through the wall and which, because of its broad output curve, does not have to be located exactly opposite the source.

In another embodiment of the invention a single detector of the larger size, say one inch in diameter, may be used, a ring-shaped radiation absorber of lead or the like being placed between the end of the detector and the wall surface during the probing or exploring operation. The absorber is provided with a hole of, say one-quarter inch in diameter, and thus the detector is responsive only to the radiation passing through that relatively small hole. As explained above the detector output curve will show a sharp maximum when directly opposite the source. After the point opposite the source has been located approximately using the absorber with the detector, the absorber is then removed permitting the detector to respond to a much larger portion of the transmitted radiation so that an accurate measurement of the thickness of the wall can be made.

Figure 2:
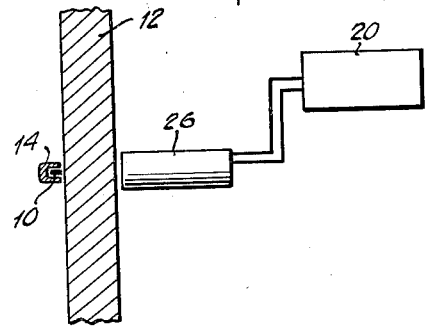
Figure 3:
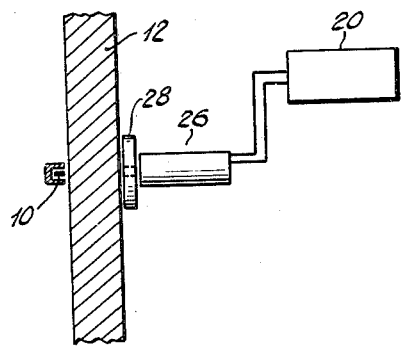
Figure 4:
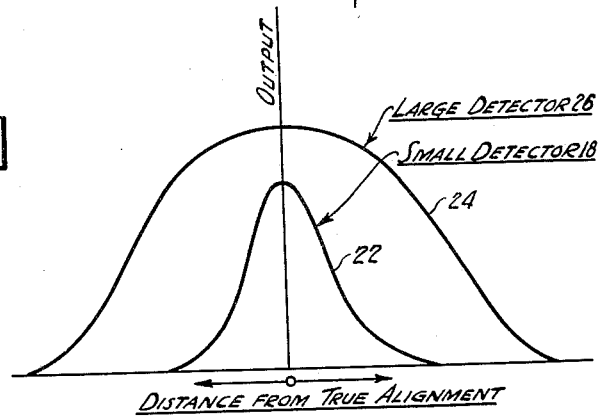
Figure 5:
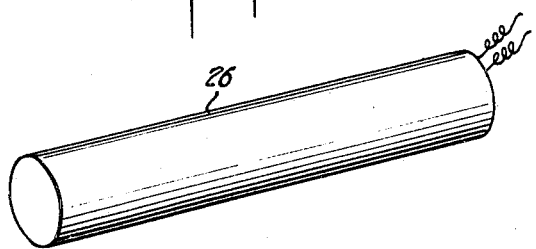
Figure 6:
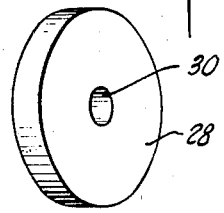

For a better understanding of the invention, reference may be had to the accompanying drawing in which:

Figure 1 is a vertical sectional elevation through a portion of a wall showing a small detector used for locating the point directly opposite the source, Figure 2 is a similar view showing a larger detector placed at the point located by the small detector for making the thickness measurement, Figure 3 is a similar view showing a modification, Figure 4 is a typical output curve showing how the output of the two detectors decreases when they are placed at increasing distances from exact alignment with the source, Figure 5 is an isometric view of a radiation detector, and Figure 6 is a similar view of an absorber used in the modification of Figure 3.

Referring to Figure 1 of the drawing a source of penetrative radiation 10 is shown as mounted on one side of a plate or wall 12 the thickness of which is to be measured. In case gamma radiation is used, the source 10 may comprise a small needle or capsule of radium or any other suitable substance either naturally or artificially radioactive and capable of emitting gamma rays. The source may be housed within a shield member 14 of lead or the like and may be attached temporarily or permanently to the wall surface by any suitable means as for instance a permanent magnet, not shown. The gamma rays from the source pass into the wall 12 in all directions as indicated by the dotted lines 16 and produce a radiation "field" at the other surface of the wall, which field is a maximum at the point exactly opposite the source. A small diameter radiation detector 18 such as a Geiger-Mueller or other counter or an ionization chamber the output of which is led to a suitable amplifier and indicator or recorder 20, is adapted to be moved about over the right hand surface of the wall while held perpendicular thereto while its output is observed or recorded by means of the device 20. The detector 18 is usually several inches in length and preferably has a diameter of about one-quarter inch. The detector is preferably surrounded at its sides with a radiation absorptive shield which may comprise a layer of lead or the like, to render the detector less sensitive to radiation entering the detector other than at its end.

With reference to Figure 4, the curve 22 shows the output of a small counter such as that indicated at 18 as it is moved in any direction away from the point of true alignment with the source. It will be observed that the peak indicating the maximum output is quite sharp. Thus assuming that the detector 18 is moved, say a quarter or half an inch, to the position indicated in dotted lines at 18a, this will result in a fairly large decrease in the response. It has been found that if such a detector is but one-quarter inch away from its position of true alignment, the response will be cut by something like 30% which figure depends, of course, on the thickness of the wall. In view of these facts one can probe the radiation field with the small detector and locate roughly, at least within one-quarter inch, the point opposite the source. The other curve 24 in Figure 4 shows the output of a larger detector 26 of say, one inch in diameter, and because of the broad peak of this curve it is obvious that the detector can be moved one-quarter inch, or even more, away from true alignment with the source without involving an appreciable change in output or in measurement of the thickness.

After the point of approximate alignment has been found as in Figure 1 the small detector 18 is removed and the larger detector 26 is placed with its center at the point located by the smaller detector 18. The detector 26 being of a larger size is responsive to a considerably larger portion of the transmitted radiation 16 and because of the broader peak of its output curve, as explained hereinbefore, even if the larger detector is slightly off exact alignment with the source, an accurate reading of the thickness of the wall, will result. The side walls of the detector 26 are preferably shielded as explained with reference to the detector 18.

Instead of using the two detectors 18 and 26 a single detector 26 can be used providing a ring-shaped radiation absorbing member or shield such as is shown at 28 is placed between the detector and the wall. The absorber 28 is provided with a small opening 30 preferably about one-quarter inch in diameter and this opening allows substantially the same amount of transmitted radiation to reach the detector 26 as reaches the smaller detector 18 without any shield. The detector 26 and the absorber 28 can therefore be used in place of the small diameter detector and after the point of maximum intensity has been located approximately, the absorber is removed, permitting the detector to respond to a larger portion of the transmitted radiation. The thickness of the absorber 28 will depend generally on the material of which it consists. Lead is a good absorber for gamma rays and for the same thickness, metals like tungsten, gold or platinum are still better absorbers.

After the large detector has been positioned properly its output will decrease with increasing wall thickness for two reasons: The first is the increase in absorption of the gamma rays while passing through the wall and the second is the increase in distance from the detector to the source due to the increase of wall thickness. The first effect follows an exponential law with respect to the thickness of the wall, whereas the second effect is governed by the inverse square law. This combined effect makes it rather difficult to express the observed intensity in terms of wall thickness by purely mathematical means. It is preferable therefore to calibrate the instrument on known thicknesses.

In the copending application of A. H. Lord, L. M. Evans, R. B. Heath and myself, Serial No. 574,870, filed January 26, 1945 relating to an improvement of the thickness measuring device disclosed in the aforementioned Hare Patent No. 2,277,756, electrical circuits are disclosed which can be used in connection with the amplification and the indication of the outputs of the detectors 18 and 24. In my copending application, Serial No. 551,368, filed August 26, 1944, a circuit is disclosed by means of which the output of a radiation counter can be converted into an audible tone, the volume of which varies proportionately with the response of the detector. If desired, such a circuit can be used with the small detector 18 so that an operator in probing the radiation field may listen to the variations in volume of a tone in a pair of ear phones or a loud speaker rather than read the variations indicated by a meter.

In the exploring operation, obviously only the relative position of the source and detector is important. It follows, therefore, that the detector 18 may be held in a fixed position and the source 10 moved about over the opposite surface of the wall to locate the point of approximate alignment.

Although gamma radiation has been mentioned as one form of the radiation to be transmitted through the wall and measured, it is to be understood that other forms of radiation and penetrating particles may also be used with the method described herein. For instance, the source 10 may comprise a mixture of radium and beryllium from which neutrons will pass into the wall 12, the transmitted neutrons being measured by a suitable neutron detector or detectors such as proportional counters or ionization chambers.

Obviously many modifications and variations of the invention, as hereinbefore set forth, may be made without departing from the spirit and scope thereof and, therefore, only such limitations should be imposed as are indicated in the appended claims.

I claim:

1. The method of measuring the thickness of a wall or plate which comprises directing penetrative radiation into said wall from a radioactive source positioned on one side of the wall, measuring the amount of radiation transmitted through the wall to a detector the output of which increases rapidly as it is brought into alignment with said source, moving said detector about over the surface of the wall opposite said source until a point is reached where the output appears to be a maximum, and then replacing said detector at said point with a second detector the output of which would decrease very slowly if moved in any direction away from true alignment with the source.

2. The method of measuring the thickness of a wall or plate which comprises directing penetrative radiation into said wall from a radioactive source positioned on one side of the wall, at the other side of the wall probing the radiation field with a radiation detector until a point is reached where the intensity is approximately a maximum, replacing said detector at said point with a second detector responsive to a larger portion of the transmitted radiation than the first detector, and measuring with said second detector the radiation transmitted from said source laterally through said wall.

3. The method of measuring the thickness of a wall or plate which comprises directing penetrative radiation into said wall from a radioactive source positioned on one side of the wall, measuring over a plurality of areas of equal size on the other side of the wall the intensity of the radiation transmitted through the wall to said areas, determining the area appearing to have the greatest intensity, and then measuring over an area having its center substantially at the center of said area of highest intensity and having a diameter several times the diameter of said area of highest intensity, the intensity of the radiation transmitted through the wall to said larger area.

4. The method of measuring the thickness of a wall or plate which comprises directing penetrative radiation into said wall from a radioactive source positioned on one side of the wall, approximately locating the point on the other side of the wall opposite said source by measuring the intensity of the radiation field in a plurality of areas, so as to find the area of approximately the greatest radiation intensity, each of said areas being smaller than that of a circle one-half inch in diameter, and then measuring the intensity of said field over an area having a diameter between three-quarters of an inch and one and one-half inches and having its center approximately at said point.

5. The method of measuring the thickness of a wall or plate which comprises directing penetrative radiation into said wall from a radioactive source positioned on one side of the wall, measuring over a plurality of areas of equal size on the other side of the wall the intensity of the radiation transmitted through the wall to said areas by means of a radiation detector, while shielding from the transmitted radiation all of the exposed surface of the detector with the exception of a relatively small surface, determining the area having approximately the greatest intensity of radiation and then measuring the intensity of said area and the surrounding area with said exposed surface of detector unshielded.

6. The method of measuring the thickness of a wall or plate which comprises directing penetrative radiation into said wall from a radioactive source positioned at one side of the wall, measuring over a plurality of areas of equal size on the other side of the wall the intensity of the radiation transmitted through the wall to said areas by means of a radiation detector while exposing to the transmitted radiation an area of the detector corresponding in size to one of the aforementioned areas, determining the area having approximately the greatest intensity of radiation, and then exposing a greater area of the detector so as to measure simultaneously the intensity of said area of greatest intensity and an additional area surrounding said area of greatest intensity.

GERHARD HERZOG.

(References on following page)

REFERENCES CITED

The following references are of record in the file of this patent:

UNITED STATES PATENTS

| Number | Name | Date |
|---|---|---|
| 831,103 | Ripperger | Sept. 18, 1906 |
| 1,985,715 | Bucky | Dec. 25, 1934 |
| 2,316,361 | Piety | Apr. 13, 1943 |
| 2,346,043 | Mysels | Apr. 4, 1944 |
| 2,346,486 | Hare | Apr. 11, 1944 |
| 2,349,429 | Herzog et al. | May 23, 1944 |
| 2,401,723 | Deming | June 11, 1946 |

OTHER REFERENCES

Locher and Weatherwax, Radiology, vol. 27, 1936 pp. 152 and 153.